United States Patent [19]

Haensel

[11] 4,296,403
[45] Oct. 20, 1981

[54] METHOD AND CIRCUIT ARRANGEMENT FOR SWITCHING AND TRANSMITTING SIGNALS IN, OR FROM, A STORED PROGRAM CONTROLLED SWITCHING SYSTEM

[75] Inventor: Eckhart Haensel, Munich, Fed. Rep. of Germany

[73] Assignee: Siemens Aktiengesellschaft, Berlin & Munich, Fed. Rep. of Germany

[21] Appl. No.: 98,387

[22] Filed: Nov. 29, 1979

[30] Foreign Application Priority Data

Dec. 8, 1978 [DE] Fed. Rep. of Germany ....... 2853138

[51] Int. Cl.³ ............................................. H04Q 3/00
[52] U.S. Cl. ............................ 340/147 P; 179/18 ES
[58] Field of Search ................. 179/18 ES; 340/147 P

[56] References Cited

U.S. PATENT DOCUMENTS 4,031,314 6/1977 Bittermann ................... 179/18 ES
4,078,158 3/1978 Houee ........................... 179/18 ES
4,095,054 6/1978 Anizan .......................... 179/18 ES

FOREIGN PATENT DOCUMENTS 1160817 9/1967 United Kingdom .

OTHER PUBLICATIONS

"Siemens System Eds-System Description" Oct. 1977.

Primary Examiner—Harold I. Pitts
Attorney, Agent, or Firm—Hill, Van Santen, Steadman, Chiara & Simpson

[57] ABSTRACT

A method and a circuit arrangement for carrying out the method are provided for the switching and transmission of signals in, or from, respectively, a stored program controlled switching system which has a plurality of feeder channels supplying signals and a plurality of receiving channels for forwarding signals. The switching orders and transmission orders relating to signals are to be handled by calling and handling of processing programs in such a manner that a control device assigning the processing programs to the individual channels is loaded as little as possible. To this end, the addresses designating the individual channels are maintained available in a separate addressing device for the entire duration of the handling of a processing program, respectively. The primary application of the invention is in the field of stored program controlled switching systems.

3 Claims, 1 Drawing Figure

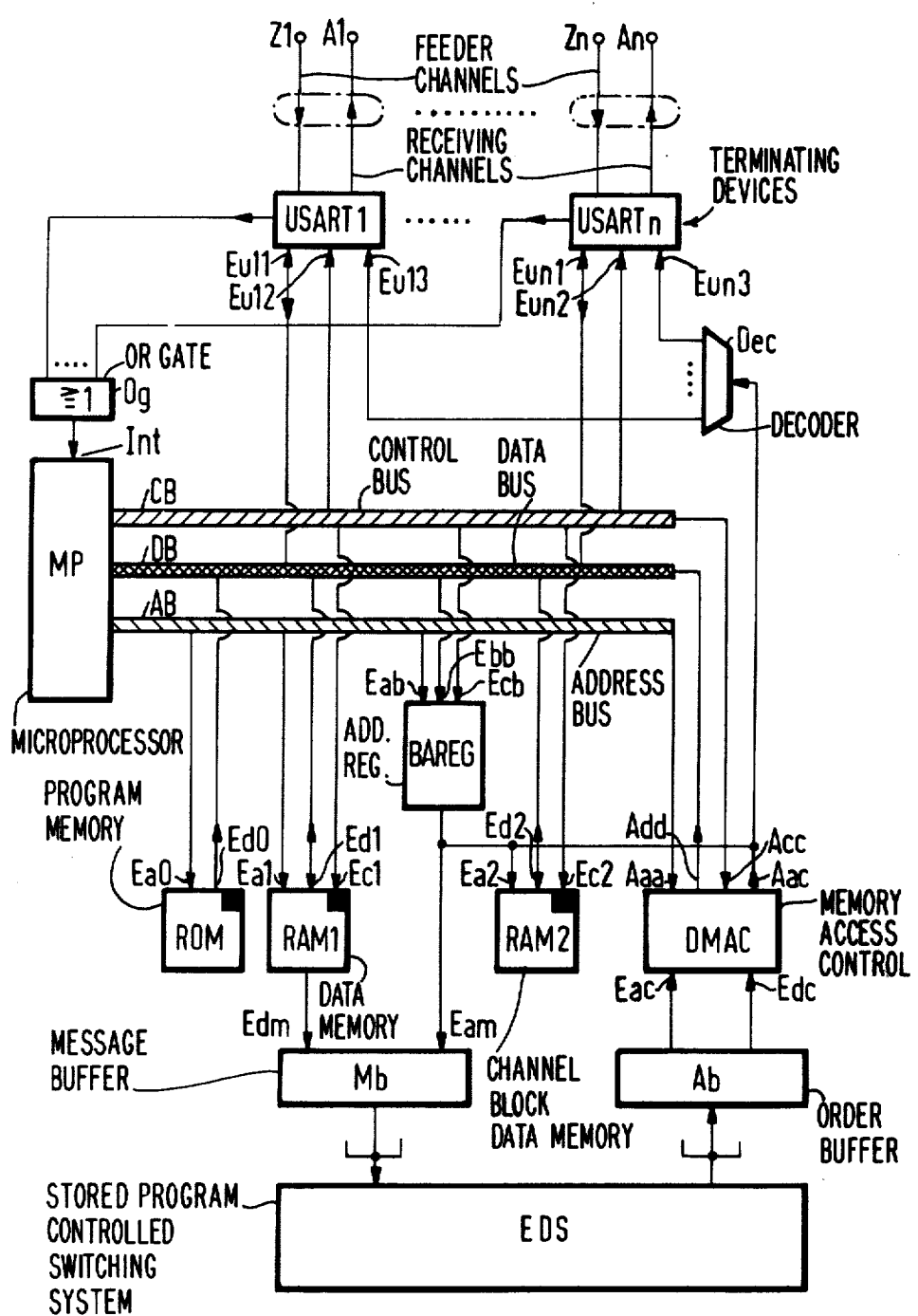

METHOD AND CIRCUIT ARRANGEMENT FOR SWITCHING AND TRANSMITTING SIGNALS IN, OR FROM, A STORED PROGRAM CONTROLLED SWITCHING SYSTEM

BACKGROUND OF THE INVENTION

1. Field of the Invention

The present invention relates to a method and to a circuit arrangement for switching and transmitting signals in, or from, a stored program control switching system which comprises a plurality of feeder channels supplying signals in the incoming transmission direction and a plurality of receiving channels for feeding away signals in the outgoing transmission direction, whereby the switching orders and transmission orders are executed by call-in and handling of processing programs which are assigned to the individual channels which can be addressed from a control device.

2. Description of the Prior Art

A method and a circuit arrangement of the type generally set forth above are well known in the art, as exemplified by German Letters Pat. No. 1,294,420. In this known method and circuit arrangement, the individual processing programs are executed with regard to the switching signals in that request signals are supplied from input code converters to a central control device contained in the actual stored program controlled switching system with which the feeder channels are connected. The execution of the processing programs for the transmission of signals by way of receiving channels is likewise brought about by the central control device. This signifies that the addresses of feeder channels and receiving channels are to be determined, or offered, respectively, relatively frequently in the central control device. It is therefore frequently necessary, in the course of handling a processing program, to constantly transmit one and the same address during a relatively long time interval in order to, in particular, execute all processing steps regarding the channel designated by the cited address. Occasionally, however, it is also necessary to access one and the same address at different times. This is particularly the case when processing operations are to be executed between such times by the central control device, such as for example the interpretation of signals which have been supplied by way of a feeder channel. Altogether, this results in a time-consuming operation for the control device with regard to determining, or offering, respectively, the addresses designating the individual channels. Altogether, the efficiency of the central control device and, hence, also of the stored program controlled switching system containing the control device is thereby relatively greatly restricted that if a correspondingly high circuit expense for the control device is not provided.

SUMMARY OF THE INVENTION

The object of the present invention is to provide, in the case of the above-considered switching and transmission signals in, or from, a stored program control switching system, that the addresses designating the individual feature channels and receiving channels can be offered in a particularly simple, yet effective, manner without requiring a relatively high expense in the control device.

The above object is achieved, in the case of a method of the type generally mentioned above, and in accordance with the present invention, in that the addressing of the individual channels is effected by virtue of the fact that, only in response to the occurrence of a switching order, a channel number, commonly designating any feeder channel and any receiving channel, is initially offered by a separate addressing device for the entire duration of the handling of the processing program, for the purpose of executing a possibly present switching order and a possibly present transmission order for these two channels. Subsequent to handling of the processing program for the two channels in succession, the channel numbers, correspondingly designating the remaining channels, are separately offered, respectively, by the addressing device for the purpose of executing possibly present switching orders and possibly present transmission orders.

The invention provides the advantage that, through a particularly simple method of operation, execution of the processing programs is permitted with a relatively low load of the control device with regard to the designation of the feeder channels and receiving channels. Therefore, the offering alone of one and the same channel number, respectively, for any feeder channel and any receiving channel, respectively, altogether entails a reduction in the loading of the control device with regard to the offering of corresponding addresses or channel numbers. Through the offering of the respective channel number for the duration of the respective handling of a processing program, moreover, it is advantageously ensured that the control device need be employed only a single time, respectively, with regard to the offering of the addresses or channel numbers, so that there is therefore present a particularly time-saving demand of the control device. The control device can therefore be advantageously utilized for the execution of additional orders.

Advantageously, subsequent to the occurrence of a message signal requesting the handling of the switching order in at least one feeder channel, all feeder channels and receiving channels are subsequently checked in a fixed sequence with regard to the execution of switching orders or transmission orders, whereby all switching orders and all transmission orders are executed in the sequence of operation of the individual channels. The advantage of a particularly simple method of operation for determining switching or transmission orders, respectively, results as a consequence.

In order to carry out the method of the present invention, it is advantageous to employ a circuit arrangement comprising a stored program controlled switching system to which a plurality of feeder channels is connected, supplying signals in the incoming transmission direction, and a plurality of receiving channels, for feeding away signals in the outgoing transmission direction, whereby the switching and the transmission of signals via the feeder channels, or the receiving channels, proceeds under the control of a control device in accordance with processing programs which determine the processing steps to be executed, respectively. In accordance with the invention, the circuit arrangement is particularly characterized in that the processing programs are stored in a separate memory which, with one address input, is connected to the output of a separate addressing device. The addressing device, in the course of operating all feeder channels and all receiving channels, constantly provides a single channel number, designating these two channels, for the duration of the handling of the processing program, respectively, relating to a feeder channel and a receiving channel. The addressing device is connected at the input side to the output of the control device which, with a separate control input, is connected to the devices determining the occurrence of signals in the feeder channels, and which is capable of determining the channel numbers of the respective feeder channels and receiving channels. The advantage of a relatively low circuit expense for the respectively required offering of the channel numbers in the course of operation of all feeder channels and all receiving channels of the switching system thereby results.

The addressing device is advantageously a register which, at the beginning of handling of each processing program for feeder channel and a receiving channel, can be loaded with the channel number designating the latter channels. The advantage of a particularly low circuit expense for the offering of the respectively required channel number in the course of operation of the feeder and receiving channels thereby results.

The above-mentioned separate memory is preferably co-utilized as a buffer memory at least for signals which are transmitted by the stored program switching system and which are to be re-transmitted to the receiving channels. There thus results the advantage of a particularly low circuit expense with regard to the retransmission of signals to the receiving channels.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which illustrates, in block diagram form, a circuit arrangement of the embodiment of the method and apparatus of the present invention.

DESCRIPTION OF THE PREFERRED EMBODIMENTS

Referring to the drawing, a circuit arrangement is illustrated which is connected between a plurality of feeder channels Z1-Zn and a plurality of receiving channels A1-An for receiving incoming signals and transmitting outgoing signals, respectively, and a stored program controlled switching system EDS, which may be of the type known per se from the publication "Der Fernmeldeingenieur", May 1972, Vol. 5, and from the publication "Siemens-System EDS-System Description", Ref. No. F234/150.18.101, 1977. This known stored program controlled switching system principally operates in such a manner that it retransmits, to suitable receiving channels, signals supplied thereto by way of feeder channels, in the form of addresses or channel numbers. The respective channel numbers or addresses are contained in memory cells of a memory belonging to the stored program controlled switching system. Such a memory cell is assigned to every feeder channel. The switching operations are, moreover, carried out in the stored program controlled switching system EDS according to the principle of communication of switching orders and the transmission of orders for the retransmission of signals. To this end, the stored program controlled switching system EDS is connected at the input side to the inputs of message buffers of which one is indicated on the drawing at Mb. At the outside side of the stored program controlled switching system EDS order buffers are provided, of which one is indicated at Ab.

The circuit arrangement illustrated on the drawing, between the feeder channels and the receiving channels, on the one hand, and the stored program controlled switching system EDS, on the other hand, comprises a control device which delivers the individual required processing operations. This control device is formed in the present case by a microprocessor MP which can be, for example, an Intel sab8085 microprocessor. The microprocessor MP has an input Int and three bus lines AB, DB, CB. The input Int is an interrupt input to which signals can be fed for interrupting the operation which has just been handled by the microprocessor MP. The bus AB is a so-called address bus, the bus DB is a data bus, and the bus CB is a control bus. The buses each comprise a plurality of individual lines.

The feeder channels Z1-Zn and the receiving channels A1-An can be formed by lines and are connected by way of terminating devices USART1-USARTn to the data bus DB and to the control bus CB. Therefore, the terminating devices USART1-USARTn are connected, with the connections Eu11 or Eun1, respectively, to the data bus DB and with connections Eu12, or Eun2, respectively, to the control bus CB of the microprocessor MP. As is apparent, one feeder line Z1 or Zn, respectively, and one receiving line A1 or An, respectively, are in each case connected to one of the terminating devices. The respective terminating devices USART1-USARTn are connected to additional connections Eu13 or Eun3, respectively, at the output of a decoder Dec which is connected at the input side to the output of an address register BAREG, which will be discussed in greater detail below. With yet further connections, the terminating devices USART1-USARTn are connected by way of an OR circuit to the interrupt line Int of the microprocessor MP.

In addition, a program memory ROM, which may be a read-only memory, is connected with its address input Ea0, possibly comprising a plurality of connections, to the address bus AB. The program memory ROM is connected to the data bus DB with a data output Ed0, which also comprises a plurality of output connections.

The microprocessor MP picks up the control commands necessary for the execution of individual control operations from the program memory ROM.

In addition, a data memory RAM1 with an address Ea1, likewise having a plurality of connections, is connected to the address bus AB. The data memory RAM1, which is a random access memory, is connected to the data bus DB with a data input Ed1, possibly also having a plurality of connections. With a control input Ec1 the memory RAM1 is connected to the control bus CB. By way of this control input Ec1, control signals are fed to the memory RAM1, upon the occurrence of which, signals are either written into the memory RAM1 or read therefrom.

The data memory RAM1 is connected, with a separate data output (so-called port), to a data input Edm of the message buffer Mb. With one address input Eam the message buffer MB is connected to the output of the address register BAREG which is utilized as an addressing device. The address register BAREG is connected to the address bus AB with an address input Eab which may also have a plurality of connections, is further connected to the data bus DB with a data input Ebb and is connected to the control bus CB with a control input Ecb.

A channel block data memory RAM2, which may also be a random access memory, has an input Ea2, which may also comprise a plurality of connections, connected to the address output of the address register BAREG. The channel block data memory RAM2, whose function shall become even more apparent below, is connected to the data bus DB with a data connection Ed2, which may also have a plurality of individual connections. With a control input Ec2, the memory RAM2 is connected to the control bus CB.

With its address input Ea2, the channel block data memory RAM2 is additionally connected to an address output Aac of a memory access control device DMAC, making possible a direct memory access, which is virtually also connected with the input side of the decoder Dec. The memory access control device DMAC is connected to the buses AB, DB, CB, with additional connections Aaa, Add and Acc, respectively. With one data input Edc and one addressing input Eac the memory access control device is connected to the output of the order buffer AB.

Before the method of operation of the circuit arrangement is discussed, it should be first pointed out that the term signals is understood to include digital signals which occur either in the form of individual polarity reversals or in the form of bit groups (blocks).

The method of operation of the circuit arrangement illustrated on the drawing shall be explained to the extent which is sufficient for one skilled in the art to understand the present invention. It is first assumed that, from at least one of the terminating devices USART1–USARTn, an information signal is emitted to the interrupt input Int of the microprocessor MP. This signal indicates that a signal feeding the stored program controlled switching system EDS has been supplied by way of at least one of the feeder channels Z1–Zn. This signal may be contained (buffered) in one of the terminating devices USART1–USARTn. In response to the occurrence of this communication signal, the microprocessor transmits addresses in succession at a frequency which is fixed by the duration of the operation of the respective feeder channel and the respective receiving channel, and emits, via the control bus CB, such a control signal, respectively, that the data information occurring at the respective time on the data bus DB reaches the register BAREG. The respective data information designates, as an address, any feeder channel and a receiving channel, such as, for example, the feeder channel Z1 and the receiving channel A1, for example two channels which are commonly connected to one of the terminating devices USART1–USARTn. The respective address represents, stated in general terms, a channel number which identifies a feeder channel and a receiving channel. This address, or channel number, respectively, is transmitted by the register BAREG up to the time of its renewed activation. With the aid of the respective address, the channel block data memory RAM2 is addressed in the present case. Moreover, one of the terminating devices USART1–USARTn is released via the decoder Dec for a signal transmission; namely, in both transmission directions. In the channel block data memory RAM2, memory areas kept available for the operation of the feeder channel and the respective receiving channel under consideration are now addressed. The microprocessor MP, as the control device of the illustrated circuit arrangement, is initially capable of reading, operating and control information of an actual processing program (namely, non-destructively) necessary for the operation of the respective feeder channel and the respective receiving channel, and then intermediately store result signals in correspondingly available memory areas of the channel block data memory RAM2, which signals are to be retained as a consequence of operation of the respective feeder and receiving channels.

In the course of operations of the type mentioned above, the signals which have occurred on the respective feeder channel and the signals which are to be transmitted by way of the respective receiving channel (a more detailed discussion provided below) are brought into formats suitable for respective retransmission. Therefore, the signals transmitted by way of the respective feeder channel are freed of additional signal elements (synchronizing bit, status bit), and correspondingly additional signal elements are added to the signals which are to be retransmitted by way of the receiving channels. With the respective operation, possibly also authorizations (or connection privileges) of the individual feeder channels and receiving channels as to the transmission or reception of signals to specified receiving channels, or from specified feeder channels can be taken into consideration. Finally, with the respective operation, control signals can be handled, or processed, respectively, which are to be accepted or transmitted. All these operations are controlled by the microprocessor MP according to the respective processing program.

The channel block data memory is jointly utilized as a buffer memory for receiving the result signals obtained during the handling of the respective processing program. The result signals, contained in the channel block data memory RAM2, relating to further feeder channels, which have been formed on the basis of the signals buffered in the terminating devices USART-1–USARTn, are supplied, under the control of the microprocessor MP, to the memory RAM1 in order to be transmitted therefrom to the communication buffer Mb. Therefore, signals and one address, respectively, are supplied to the communication buffer Mb, whereupon the latter emits to the stored program control switching system EDS a corresponding switching order, respectively, upon the occurrence of which the switching of the respective signals is executed.

The result signal relating to receiving channels and which are to be retransmitted by way of the latter are formed by executing corresponding transmission orders. These orders (comprising signals and addresses) arrive from the stored program control switching system EDS by way of the order buffer Ab to the memory access control device DMAC; they are executed corresponding to the processing programs contained in the channel block data memory RAM2. The result signals arising as a consequence of this program execution are intermediately stored in the channel block data memory RAM2 before they are forwarded to the receiving channel under consideration. The respective receiving channel is therefore connected with that particular terminating device USART1–USARTn which is still released by the address register BAREG.

After handling of the processing steps for the two channels (a feeder channel and a receiving channel) which are identified by the address contained in the register BAREG, the microprocessor emits an additional address via the address bus DB, as well as a corresponding control signal by way of the control bus CB, and possibly an additional data information via the data bus in order to store a new address in the address register BAREG. Subsequently, the above-discussed operations are executed for an additional channel pair. In this manner, processing operations, representing processing programs, for all channel pairs are altogether executed in succession, whereby the addresses (data information) of the channel pairs are only briefly offered by the microprocessor MP, respectively, and then stored in the address register BAREG. It should be pointed out that it is also readily possible to vary an address once stored in the register BAREG by supplying only one control signal to this register. Therefore, it suffices in this case to load an address into the register BAREG but a single time in the course of operation of all channel pairs Z1, A1-Zn, An. The respective register can in this case, in a particularly advantageous fashion, be designed as a counter.

In connection with the operation of channel pairs as discussed above, it should also be noted that operation is preferably carried out such that, per channel pair, first the feeder channel and subsequently the receiving channel is operated. As has been previously explained, only the occurrence of signals in feeder channels has a consequence that a corresponding information is provided to the microprocessor MP at its interrupt input Int. The occurrence of signals which are to be forwarded via receiving channels or lines, respectively, has, however, no such effect. If the stored program controlled switching system EDS transmits signals which are to be retransmitted via receiving channels or receiving lines, this occurs in such a manner that first a direct memory access to the channel block data memory RAM2 takes place via the memory access control device DMAC. In this case, the memory access control device DMAC, through emission of a control signal to the control bus CB, causes the microprocessor MP to be switched off, so to speak; for example, it executes no control functions whatsoever via the buses. The signals thus stored in the memory areas of the channel block data memory RAM2 via the memory access controlled device DMAC are only retransmitted by way of the terminating devices USART1-USARTn when the microprocessor MP emits corresponding addresses to the address register BAREG. As mentioned above, this is the case when, in at least one of the feeder channels, a signal occurs which is to be supplied to the stored program controlled switching system EDS. Through the addresses then contained in the register BAREG, moreover, also the terminating devices USART1-USARTn are subsequently released for a signal transmission. This proceeds by way of the decoder Dec.

According to the method of operation set forth above, only signals occurring in the feeder channels Z1-Zn therefore cause the microprocessor MP to load addresses into the register BAREG by means of which memory areas of the channel block data memory RAM2 are addressed, which memory areas pertain to the individual feeder channels and receiving channels. The signals emitted by the stored program controlled switching system EDS, in the course of transmission orders, respectively, for retransmission in receiving channels, however, lead only to the result that they are for the time being intermediately stored in the channel block data memory. In this case, therefore during emission of transmission orders from the switching system EDS, it was possible to dispense with the emission of corresponding information signals to the interrupt input Int of the microprocessor MP, since the signals thus occurring in the channel block data memory RAM2 can be intermediately stored; i.e., they do not become lost. It is moreover possible to emit from the memory access control device DMAC a corresponding control signal to the stored program controlled switching system EDS in case that in the channel block data memory RAM2 memory capacity is no longer available for the intermediate storage of signals. In this case, the stored program controlled switching system EDS then stops with the emission of corresponding signals until the channel block data memory RAM2 is again available for receiving signals. This will be the case when a corresponding signal has arrived in one of the feeder channels and has lead to the emission of a corresponding information signal to the interrupt input Int of the microprocessor MP. Altogether, through this method of operation, a particularly low loading of the microprocessor MP results with regard to the offering of addresses, by means of which the individual feeder channels and receiving channels are designated.

In conclusion, it is additionally pointed out that the devices illustrated in block form on the drawing can be commercially-available devices. Therefore, the terminating devices USART1-USARTn can be integrated circuit chips 8251A of Intel. The program memory can, for example, be formed of three chips of the type Intel 2716. The data memory RAM1 can be constructed from an Intel 8155 chip, while the channel block data memory can be constructed from two Intel 2114 chips. The memory access control device DMAC can be constructed of two 8257-5 Intel chips. The message buffer Mb and the order buffer Ab can be formed from a number of MM67401 chips. The register BAREG, employed as an addressing device, can be formed from a SN74LS173 chip. The decoder Dec can be constructed with a SN74LS138 chip. The OR gate Og can be a conventional diode OR gate. In utilizing an Intel 8085A microprocessor, the following performance features can be achieved for the arrangement illustrated on the drawing:

Operation of eight feeder channels and eight receiving channels with a bit rate of 2.4 kbits/s, respectively, or Operation of four feeder channels and four receiving channels with a bit rate of 4.8 kbit/s, respectively, or Operation of two feeder channels and two receiving channels with a bit rate of 9.6 kbit/s, respectively.

This numerical information relates to presently possible bit rates which can be realized in connection with a stored program controlled switching system of the type set forth above. Since, as a rule, more than the above-designated number of feeder channels and receiving channels will be connected to a stored program control switching system, the circuit arrangement illustrated on the drawing will be connected, in a corresponding increased number, with such a stored program controlled switching system. This is also indicated on the drawing by corresponding multiple marks between the message buffer Mb, and the system EDS, on the one hand, and between the system EDS and the order buffer Ab, on the other hand.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for switching and emitting signals in or from, respectively, a stored program controlled switching system having a plurality of addressable feeder channels supplying signals in the incoming transmission direction and a plurality of like-addressed receiving channels for feeding signals out in the outgoing direction, comprising:

a stored program controlled switching system connected to the plurality of feeder channels which supply signals in the incoming transmission direction and to the plurality of receiving channels which feed signals in the outgoing transmission direction;

control means including programs stored therein for determining the processing steps to be executed;

said control means including a memory storing the processing programs;

an addressing device connected to said memory for receiving addresses and emitting a channel address designating a feeder channel and a receiving channel for the duration of the handling of the processing program relating thereto;

a control device including a control input, said control input connected to said addressing device for feeding addresses thereto;

a plurality of terminating devices connected to the feeder channels for receiving and recognizing the occurrence of signals therein, said terminating devices connected to said control input of said control device and operable to cause said control device to feed channel addresses to said addressing device; and means connected between said addressing device and said terminating devices and operable in response to addresses to condition the addressed terminating devices for transmission in both directions over the respective addressed channels.

2. The circuit arrangement of claim 1, wherein said addressing device comprises a register which, at the beginning of handling of every process program for a feeder channel and a receiving channel, includes means for receiving and being loaded with the channel address designating such channels.

3. The circuit arrangement according to claim 2, wherein said memory is connected to and operable to store signals from the program controlled switching system which are to be retransmitted to the receiving channels.

* * * * *